United States Patent
Yu

(10) Patent No.: US 12,323,878 B2
(45) Date of Patent: Jun. 3, 2025

(54) ROAD SIDE POSITIONING METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Ziqiang Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 368 days.

(21) Appl. No.: 17/883,535

(22) Filed: Aug. 8, 2022

(65) Prior Publication Data

US 2022/0386071 A1 Dec. 1, 2022

Related U.S. Application Data

(63) Continuation of application No. PCT/CN2021/105049, filed on Jul. 7, 2021.

(30) Foreign Application Priority Data

Aug. 13, 2020 (CN) .......................... 202010813638.2

(51) Int. Cl.
*H04B 1/26* (2006.01)
*G06N 20/00* (2019.01)
(Continued)

(52) U.S. Cl.
CPC ............ *H04W 4/025* (2013.01); *G06N 20/00* (2019.01); *H04B 17/318* (2015.01); *H04W 4/029* (2018.02)

(58) Field of Classification Search
CPC ....... H04W 4/025; H04W 4/029; H04W 4/02; G06N 20/00; H04B 17/318; G01S 5/0278; G01S 5/0036; G01S 19/42; G06F 18/214
(Continued)

(56) References Cited

U.S. PATENT DOCUMENTS 5,846,354 A * 12/1998 Winston ................ B60C 23/004
                                                     92/92
6,285,943 B1* 9/2001 Boulter ............ G08G 1/096791
                                                     701/119
(Continued)

FOREIGN PATENT DOCUMENTS

| CN | 107861138 A | 3/2018 |
| CN | 108700666 A | 10/2018 |

(Continued)

OTHER PUBLICATIONS

The World Intellectual Property Organization (WIPO) International Search Report for PCT/CN2021/105049 Sep. 28, 2021 6 Pages (including translation).

*Primary Examiner* — Amancio Gonzalez
(74) *Attorney, Agent, or Firm* — ANOVA LAW GROUP, PLLC

(57) ABSTRACT

A roadside positioning method includes: obtaining positioning information of the user terminal, the positioning information being used for indicating a geographic location of the user terminal; obtaining wireless signal information of the user terminal, the wireless signal information being used for indicating wireless signals acquired by the user terminal at the geographic location; and determining a roadside positioning result of the user terminal based on the positioning information and the wireless signal information, the road- (Continued)

side positioning result being used for indicating a roadside on which the user terminal is located.

20 Claims, 9 Drawing Sheets

(51) Int. Cl.
 *H04B 17/318* (2015.01)
 *H04W 4/02* (2018.01)
 *H04W 4/029* (2018.01)
(58) Field of Classification Search
 USPC .......................................................... 455/431
 See application file for complete search history.

(56) References Cited

U.S. PATENT DOCUMENTS

| | | | | |
|---|---|---|---|---|
| 6,751,535 | B2 * | 6/2004 | Mori | G01S 19/14 |
| | | | | 318/587 |
| 6,781,523 | B2 * | 8/2004 | Matsui | G07B 15/063 |
| | | | | 340/933 |
| 8,108,144 | B2 * | 1/2012 | Forstall | G01C 21/3807 |
| | | | | 340/988 |
| 8,290,513 | B2 * | 10/2012 | Forstall | H04L 67/52 |
| | | | | 455/457 |
| 8,369,867 | B2 * | 2/2013 | Van Os | H04W 4/02 |
| | | | | 455/457 |
| 8,660,530 | B2 * | 2/2014 | Sharp | H04L 67/125 |
| | | | | 455/565 |
| 8,666,367 | B2 * | 3/2014 | Sharp | H04W 12/068 |
| | | | | 701/472 |
| 8,670,748 | B2 * | 3/2014 | Slack | G06F 3/04842 |
| | | | | 701/472 |
| 8,730,260 | B2 * | 5/2014 | Funabashi | G08G 1/096783 |
| | | | | 345/619 |
| 8,774,825 | B2 * | 7/2014 | Forstall | G01C 21/3438 |
| | | | | 455/456.2 |
| 9,188,451 | B2 * | 11/2015 | Magnusson | G01C 21/34 |
| 9,702,721 | B2 * | 7/2017 | Blumenberg | G01C 21/3667 |
| 9,979,776 | B2 * | 5/2018 | Slack | H04W 12/082 |
| 10,001,565 | B2 * | 6/2018 | Hwu | G01S 19/41 |
| 10,303,168 | B2 * | 5/2019 | Horita | B60W 40/02 |
| 10,332,395 | B1 * | 6/2019 | Berg | G01S 19/41 |
| 10,368,199 | B2 * | 7/2019 | Van Os | H04L 67/52 |
| 10,445,817 | B2 * | 10/2019 | Briggs | G06Q 10/0875 |
| 10,529,236 | B1 * | 1/2020 | Balakrishnan | G08G 1/005 |
| 10,754,003 | B2 * | 8/2020 | Kang | G08G 1/0141 |
| 11,127,042 | B2 * | 9/2021 | Wasserman | G08G 1/093 |
| 11,144,770 | B2 * | 10/2021 | Rui | G06V 10/752 |
| 11,221,221 | B2 * | 1/2022 | Forstall | G06F 3/0482 |
| 11,308,316 | B1 * | 4/2022 | Ali | H04N 7/188 |
| 11,477,758 | B2 * | 10/2022 | Choi | H04W 64/006 |
| 11,600,172 | B2 * | 3/2023 | Liu | G08G 1/0108 |
| 11,622,232 | B2 * | 4/2023 | Choi | G01S 11/02 |
| | | | | 455/456.1 |
| 11,830,357 | B1 * | 11/2023 | Murphy | G08G 1/0145 |
| 12,008,840 | B2 * | 6/2024 | Heath | G06Q 10/0832 |
| 12,028,744 | B2 * | 7/2024 | Van Duren | H04W 28/0284 |
| 2006/0017562 | A1 * | 1/2006 | Bachelder | G08G 1/017 |
| | | | | 382/105 |
| 2006/0224300 | A1 * | 10/2006 | Shioya | G08G 1/164 |
| | | | | 701/1 |
| 2008/0200121 | A1 * | 8/2008 | Yamamoto | G08G 1/094 |
| | | | | 455/41.2 |
| 2012/0172057 | A1 * | 7/2012 | Kobayashi | G08G 1/0112 |
| | | | | 455/456.1 |
| 2013/0076562 | A1 | 3/2013 | Lee | |
| 2014/0066091 | A1 | 3/2014 | Varoglu et al. | |
| 2020/0150210 | A1 * | 5/2020 | Krysiuk | G01S 3/801 |
| 2021/0180958 | A1 * | 6/2021 | Juang | G06V 10/757 |
| 2022/0386071 | A1 * | 12/2022 | Yu | G01S 5/0278 |

FOREIGN PATENT DOCUMENTS

| | | |
|---|---|---|
| CN | 109218970 A | 1/2019 |
| CN | 110493714 A | 11/2019 |
| CN | 112748453 A | 5/2021 |

\* cited by examiner

ROAD SIDE POSITIONING METHOD AND APPARATUS, DEVICE, AND STORAGE MEDIUM

RELATED APPLICATION(S)

This application is a continuation application of PCT Patent Application No. PCT/CN2021/105049 filed on Jul. 7, 2021, which claims priority to Chinese Patent Application No. 202010813638.2, entitled "ROAD SIDE POSITIONING METHOD AND APPARATUS, DEVICE, AND STORAGE MEDIUM" filed on Aug. 13, 2020, all of which are incorporated by reference in entirety.

FIELD OF THE TECHNOLOGY

The present disclosure relates to the field of computer and Internet technologies, and in particular, to a roadside positioning method and apparatus, a device, and a storage medium.

BACKGROUND

Positioning and navigation system has become a common tool in people's lives.

By way of example, a terminal obtains current positioning information of a user through a global positioning system (GPS), to determine a current geographic location of the user according to the current positioning information.

However, when the user is located on a side of a road, which side of the road on which the user is located cannot be precisely determined due to the positioning deviation.

SUMMARY

Embodiments of the present disclosure provide a roadside positioning method and apparatus, a device, and a storage medium, which can improve roadside positioning. The technical solutions are as follows:

In one aspect, the present disclosure provides a roadside positioning method, the method including: obtaining positioning information of the user terminal, the positioning information being used for indicating a geographic location of the user terminal; obtaining wireless signal information of the user terminal, the wireless signal information being used for indicating wireless signals acquired by the user terminal at the geographic location; and determining a roadside positioning result of the user terminal based on the positioning information and the wireless signal information, the roadside positioning result being used for indicating a roadside on which the user terminal is located.

In another aspect, the present disclosure provides a method for training a roadside positioning model, the training method including: obtaining terminal driving data, the terminal driving data including positioning information and wireless signal information of a sample terminal, the positioning information being used for indicating a geographic location of the sample terminal, and the wireless signal information being used for indicating wireless signals acquired by the sample terminal at the geographic location; generating a training sample based on the terminal driving data, sample data of the training sample including the positioning information and the wireless signal information of the sample terminal, label data of the training sample including a label value of a roadside positioning result of the sample terminal, and the roadside positioning result being used for indicating a roadside on which the sample terminal is located; and training a roadside positioning model by using the training sample.

In yet another aspect, the present disclosure provides a roadside positioning apparatus, the apparatus includes a memory storing computer program instructions; and a processor coupled to the memory and configured to execute the computer program instructions and perform: obtaining positioning information of a user terminal, the positioning information being used for indicating a geographic location of the user terminal; obtaining wireless signal information of the user terminal, the wireless signal information being used for indicating wireless signals acquired by the user terminal at the geographic location; and determining a roadside positioning result of the user terminal based on the positioning information and the wireless signal information, the roadside positioning result being used for indicating a roadside on which the user terminal is located.

In yet another aspect, the present disclosure provides a non-transitory computer-readable storage medium storing computer program instructions executable by at least one processor to perform: obtaining positioning information of a user terminal, the positioning information being used for indicating a geographic location of the user terminal; obtaining wireless signal information of the user terminal, the wireless signal information being used for indicating wireless signals acquired by the user terminal at the geographic location; and determining a roadside positioning result of the user terminal based on the positioning information and the wireless signal information, the roadside positioning result being used for indicating a roadside on which the user terminal is located.

The technical solutions provided in the embodiments of the present disclosure may bring the following beneficial effects:

By calibrating positioning information of a user terminal through wireless signal information, a more desirable positioning result is obtained, and a roadside on which the user terminal is located is determined, thereby improving roadside positioning, and avoiding that the roadside on which the user terminal is located cannot be determined due to the positioning deviation when the road is too narrow. In this way, a geographic location of the user terminal can be determined according to the positioning result, and the time and manpower consumption in a process of searching for the user terminal caused by a location error can be reduced.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s)," "some embodiments," "certain embodiment(s)," or "certain embodiments" may refer to one or more subsets of all possible embodiments. When and as applicable, the term "an embodiment," "one embodiment," "some embodiment(s)," "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The solutions provided in the embodiments of the present disclosure relate to an artificial neural network technology of artificial intelligence. A roadside positioning model may be obtained by training of the artificial neural network technology, and according to the roadside positioning model, a roadside on which a user terminal is located may be determined based on positioning information and wireless signal information of the user terminal.

Figure 1:
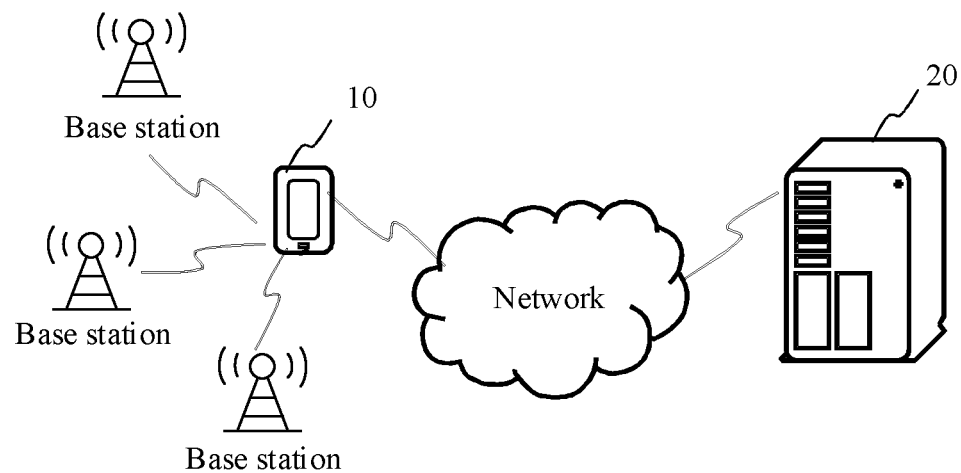
FIG. 1 is a schematic diagram of a roadside positioning system according to certain embodiment(s) of the present disclosure.

FIG. 1 is a schematic diagram of a roadside positioning system according to an embodiment of the present disclosure. The roadside positioning system may include: a user terminal 10 and a server 20.

The user terminal 10 is used for providing positioning information and wireless signal information for the server 20. The positioning information is used for indicating a geographic location of the user terminal 10, and the wireless signal information is used for indicating wireless signals acquired by the user terminal 10 at the geographic location. Exemplarily, the wireless signal information includes, but is not limited to, at least one of the following: a base station signal, a wireless fidelity (WiFi) signal, and the like. In certain embodiment(s), the user terminal 10 may be any device with a wireless signal acquisition function, for example, an electronic device such as a mobile phone, a tablet computer, a game console, an e-book reader, a multimedia player, a wearable device, or a personal computer (PC). The user terminal 10 may include a client of a target application, and the target application may be any application with a positioning function, such as a navigation application, a social application, and a shopping application. The target application may be an application that needs to be downloaded and installed, or may be a click-to-use application. This is not limited in this embodiment of the present disclosure.

The server 20 is used for providing a roadside positioning service for the user terminal 10. For example, the server 20 may be a background server provided by the target application. The server may be an independent physical server, or may be a server cluster including a plurality of physical servers or a distributed system, or may be a cloud server providing cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

In certain embodiment(s), the user terminal 10 and the server 20 are directly or indirectly connected in a wired or wireless communication manner. This is not limited in the present disclosure. Exemplarily, the server 20 may provide services for the above target applications in a plurality of user terminals. In this embodiment of the present disclosure, the server 20 may determine a roadside on which the user terminal 10 is located according to the positioning information and the wireless signal information provided by the user terminal 10.

Figure 2:
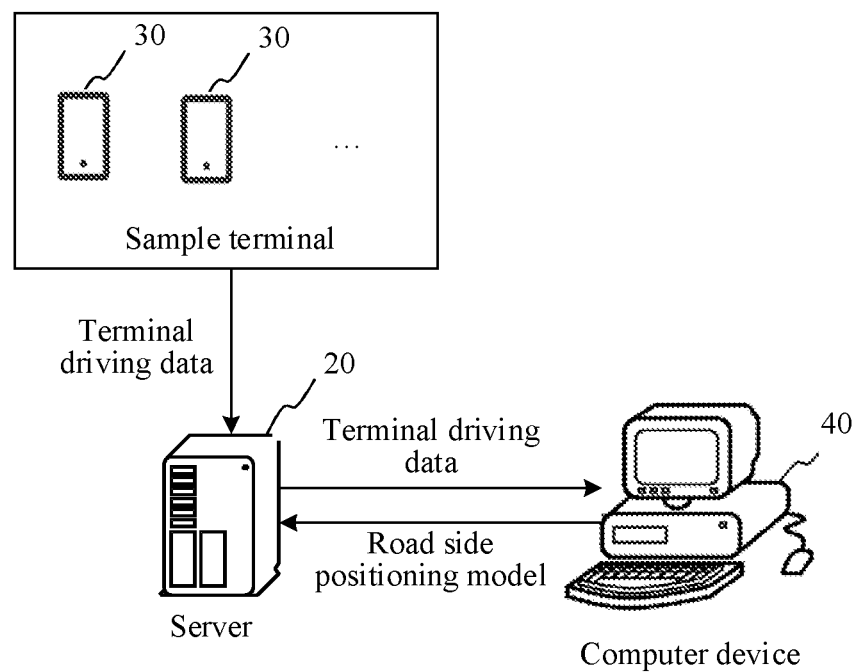
FIG. 2 is a schematic diagram of a system for training a roadside positioning model according to certain embodiment(s) of the present disclosure.

FIG. 2 is a schematic diagram of a system for training a roadside positioning model according to an embodiment of the present disclosure. The system for training a roadside positioning model may include: a server 20, a sample terminal 30, and a model training device 40.

The sample terminal 30 is used for providing training data for the model training device 40. The training data may be generated through terminal driving data. In certain embodiment(s), the sample terminal 30 is any device with a positioning function and a wireless signal acquisition function, for example, an electronic device such as a mobile phone, a tablet computer, a game console, an e-book reader, a multimedia player, a wearable device, or a PC. In certain embodiment(s), the sample terminal 30 includes the above target application. The sample terminal 30 may transmit acquired terminal driving data to the server 20 by the target application. In certain embodiment(s), the server 20 may transmit the terminal driving data to the model training device 40. Alternatively, the server 20 may also generate a training sample according to the terminal driving data, and provide the training sample for the model training device 40. In an exemplary embodiment, the sample terminal 30 may also directly transmit the above terminal driving data to the model training device 40. This is not limited in this embodiment of the present disclosure.

The model training device 40 is used for training the roadside positioning model. In certain embodiment(s), the model training device 40 is an electronic device such as a server, a computing device, or a PC. In this embodiment of the present disclosure, the model training device 40 may obtain the roadside positioning model by training the training sample provided by the server 20. Definitely, the model training device 40 may also obtain the roadside positioning model by training the terminal driving data provided by the sample terminal 30.

The server 20 and the model training device 40 may be different computing devices or the same computing device. This is not limited in this embodiment of the present disclosure.

In certain embodiment(s), the server 20, the sample terminal 30, and the model training device 40 may communicate with each other through a network.

The technical solutions of the present disclosure are described in detail below combined with a plurality of embodiments.

Figure 3:
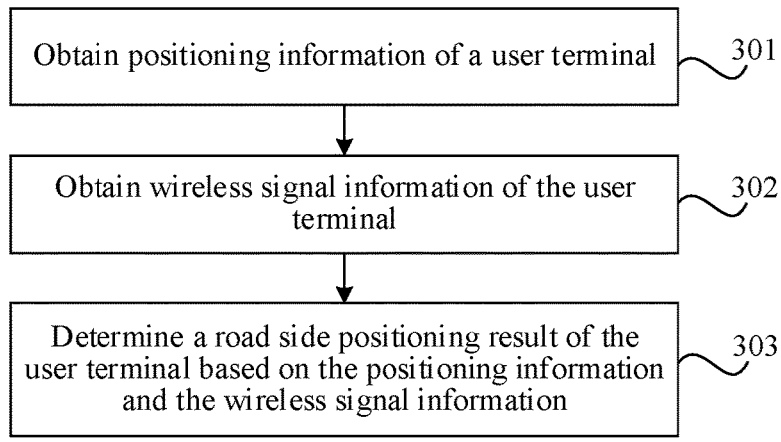
FIG. 3 is a schematic flowchart of a roadside positioning method according to certain embodiment(s) of the present disclosure.

FIG. 3 is a flowchart of a roadside positioning method according to an embodiment of the present disclosure. The method may be applied to a computing device. For example, an execution entity of each step may be the user terminal 10 in the roadside positioning system shown in FIG. 1. The method may include the following steps (301 to 303):

Step 301. Obtain positioning information of a user terminal.

The positioning information is used for indicating a geographic location of the user terminal. In certain embodiment(s), the positioning information includes specific location information for indicating that the user terminal is located on the location. Alternatively, the positioning information may also include a location range for indicating that the user terminal may be located on a specific location of the location range.

In this embodiment of the present disclosure, when a positioning execution request for the user terminal is detected, the user terminal obtains the positioning information of the user terminal based on the positioning execution request. In certain embodiment(s), the positioning execution request is generated by triggering of a user. For example, after an operation signal of the user for a target application is detected, the user terminal generates a positioning execution request for the user terminal based on the operation signal, to obtain positioning information of the user terminal. The above target application may be any application with a positioning function, and the above operation instruction may be a click instruction for a positioning icon of the target application.

Exemplarily, the target application is a navigation application, and the operation signal is an operation signal of a program start operation. When the program start operation for the navigation application is detected, the user terminal displays a user interface of the navigation application in a user interface. Because the navigation application is generally used for planning a route, the user terminal obtains the positioning information of the user terminal when the navigation application is opened. Alternatively, the target application is a shopping application, and the operation signal is an operation signal of an ordering operation. When an ordering operation for a commodity in the shopping application is detected, the user terminal obtains the positioning information of the user terminal, to help ensure subsequent smooth transportation of the commodity.

In an exemplary embodiment, the above user terminal may also generate the above positioning execution request when a positioning permission enabling instruction is detected, to obtain the positioning information of the user terminal. Exemplarily, the positioning permission enabling instruction is an instruction generated by the user terminal when detecting that the user opens an application with a positioning permission. Alternatively, the positioning permission enabling instruction is an instruction generated by the user terminal when a trigger operation for a positioning start control is detected.

In certain embodiment(s), the user terminal obtains the positioning information of the user terminal through a positioning system such as a GPS. The positioning information of the user terminal may include latitude and longitude information of the user terminal. In certain embodiment(s), the latitude and longitude information may be latitude and longitude information of a specific location for indicating a specific geographic location of the user terminal. Alternatively, the latitude and longitude information may be latitude and longitude information of a specific location range for indicating a geographic range in which the user terminal may be located.

In this embodiment of the present disclosure, if the user terminal is in a moving state, the user terminal may obtain the positioning information of the user terminal in real time according to movement of the user terminal, and update the positioning information of the user terminal. In certain embodiment(s), when updating the positioning information, the user terminal may use newly obtained positioning information to cover historical positioning information, or may record the newly obtained positioning information and the historical positioning information simultaneously.

Step 302. Obtain wireless signal information of the user terminal.

The wireless signal information is used for indicating wireless signals currently acquired by the user terminal, such as a base station signal, and a WiFi signal. The geographic location may be a geographic location indicated by the above positioning information, or may be a real-time geographic location of the user terminal in a movement process. In certain embodiment(s), the wireless signal information may include a correspondence between identification information of at least one group of wireless transmission apparatuses and signal strength information. The identification information of the wireless transmission apparatuses plays a role in identifying the wireless transmission apparatuses (such as, a base station, and an access point (AP)). Different wireless transmission apparatuses have different identification information, and the user terminal may determine locations on which the wireless transmission apparatuses are located according to the identification information. The signal strength information is used for indicating signal strengths of wireless signals, and the user terminal may estimate distances between wireless signal transmission points and the user terminal according to the signal strengths. In this embodiment of the present disclosure, the user terminal may obtain the wireless signal information of the user terminal according to a signal acquisition apparatus disposed in the user terminal.

In certain embodiment(s), the user terminal obtains the wireless signal information of the user terminal when obtaining the above positioning information. In certain embodiment(s), after a signal obtaining request is detected, the user terminal may obtain the positioning information and the wireless signal information of the user terminal according to the signal obtaining request.

In certain embodiment(s), after the above positioning information is obtained, the user terminal obtains the wireless signal information of the user terminal. In certain embodiment(s), after the above positioning information is obtained, the user terminal determines whether to obtain the wireless signal information based on the positioning information. If the user terminal determines to obtain the wireless signal information, the user terminal obtains the wireless signal information of the user terminal. Definitely, to help ensure real-time performance of the positioning information, the user terminal may obtain the positioning information of the user terminal again when obtaining the above wireless signal information.

In this embodiment of the present disclosure, if the user terminal is in the moving state, the user terminal may obtain the wireless signal information of the user terminal in real time according to movement of the user terminal, and update the wireless signal information of the user terminal. In certain embodiment(s), when updating the wireless signal information of the user terminal, the user terminal may use newly obtained wireless signal information to cover historical wireless signal information, or may record the newly obtained wireless signal information and the historical wireless signal information simultaneously. In the movement process of the user terminal, the user terminal obtains new positioning information when obtaining the above newly obtained wireless signal information, to help ensure positioning information.

Step 303. Determine a roadside positioning result of the user terminal based on the positioning information and the wireless signal information.

The roadside positioning result is used for indicating a roadside on which the user terminal is located. The roadside is a side of a road. In certain embodiment(s), the road includes two sides, and the roadside positioning result is used for indicating which one of the two sides of the road on which the user terminal is located. In certain embodiment(s), the roadside positioning result includes location information of which one of the two sides of the road. For example, the roadside positioning result is used for indicating that the user terminal is located on a left (right) side or an upper (lower) side of a road. In certain embodiment(s), the roadside positioning result includes a roadside feature. The roadside feature is used for indicating a feature of the roadside on which the user terminal is located. For example, the roadside positioning result is used for indicating that the user terminal and a store A are located on the same side of a road.

In this embodiment of the present disclosure, after the positioning information and the wireless signal information are obtained, the user terminal determines the roadside positioning result of the user terminal based on the positioning information and the wireless signal information. The above positioning information and wireless signal information may be information obtained simultaneously. For example, the user terminal obtains the positioning information and the wireless signal information simultaneously according to a specific time interval, to help ensure real-time performance of the positioning information and the wireless signal information. In certain embodiment(s), the user terminal may determine the above roadside positioning result according to a roadside positioning model. The roadside positioning model is a machine learning model configured to determine the roadside positioning result.

In certain embodiment(s), the user terminal may directly invoke the roadside positioning model, to directly determine the above roadside positioning result. The roadside positioning model is a machine learning model configured to determine the roadside positioning result. In certain embodiment(s), step 303 includes the following steps:

1. Input the positioning information and the wireless signal information to the roadside positioning model.
2. Obtain the roadside positioning result of the user terminal outputted by the roadside positioning model.

In this embodiment of the present disclosure, after the above positioning information and the above wireless signal information are obtained, the user terminal invokes the above roadside positioning model, to determine the roadside positioning result of the user terminal according to the positioning information and the wireless signal information. The roadside positioning result is used for indicating the roadside on which the user terminal is located. In certain embodiment(s), the above roadside positioning result may include location information of which one of the two sides of the road, or may include the roadside feature. This is not limited in this embodiment of the present disclosure.

In certain embodiment(s), after the above wireless signal information is screened based on the positioning information, the user terminal may invoke the roadside positioning model, to determine the above roadside positioning result. In certain embodiment(s), after the above positioning information and the above wireless signal information are obtained, the user terminal may use the positioning information as a constraint condition, and screen the wireless signal information, to obtain screened wireless signal information; and invoke the roadside positioning model, to determine the roadside positioning result of the user terminal in combination with the above positioning information based on the screened wireless signal information. For example, the screened wireless signal information and the above positioning information are inputted to the above roadside positioning model, and the roadside positioning result outputted by the roadside positioning model is obtained.

In certain embodiment(s), the user terminal may use the above positioning information as the constraint condition, and screen the wireless signal information based on the identification information of the wireless transmission apparatuses in the wireless signal information. In this embodiment of the present disclosure, after the above wireless signal information is obtained, the user terminal determines locations of the wireless transmission apparatuses based on the identification information of the wireless transmission apparatuses in the wireless signal information, determines location distances between the wireless transmission apparatuses and the user terminal according to the above positioning information, and screens the wireless signal information according to the location distances, to obtain the screened wireless signal information. In certain embodiment(s), the user terminal may screen the above wireless signal information based on a threshold value corresponding to the above location distances. In certain embodiment(s), the user terminal may select wireless signal information corresponding to wireless signal transmission apparatuses whose location distances are greater than the above threshold as the screened wireless signal information. In certain embodiment(s), the user terminal may screen the above wireless signal information based on an order corresponding to the above location distances. In certain embodiment(s), the user terminal may sort the above wireless signal information based on a descending order of the location distances, to select first n pieces of wireless signal information as the screened wireless signal information. n may be any preset value. This is not limited in this embodiment of the present disclosure.

In certain embodiment(s), the user terminal may use the above positioning information as the constraint condition, and screen the wireless signal information based on the signal strength information in the wireless signal information. In certain embodiment(s), after the above wireless signal information is obtained, the user terminal determines locations of the wireless transmission apparatuses based on the signal strength information in the wireless signal information, estimates location distances between the wireless transmission apparatuses and the user terminal according to the above positioning information, and screens the wireless signal information according to the location distances, to obtain the screened wireless signal information. In certain embodiment(s), the user terminal may screen the above wireless signal information based on a threshold value corresponding to the above location distances. Alternatively, the user terminal may screen the above wireless signal information based on an order corresponding to the above location distances. In certain embodiment(s), after the above wireless signal information is obtained, the user terminal selects, based on the signal strength information in the wireless signal information, wireless signal information whose signal strengths have a greater difference as the above screened wireless signal information. Exemplarily, when screening the wireless signal information, the user terminal selects wireless signal information whose signal strengths are greater than a first threshold value as the screened wireless signal information, and selects wireless signal information whose signal strengths are less than the first threshold value as the screened wireless signal information.

In summary, in the technical solutions provided in this embodiment of the present disclosure, by calibrating positioning information of a user terminal through wireless signal information, a more desirable positioning result is obtained, and a roadside on which the user terminal is located is determined, thereby improving roadside positioning, and avoiding that the roadside on which the user terminal is located cannot be determined due to the positioning deviation when the road is too narrow. In this way, a geographic location of the user terminal can be determined according to the positioning result, and the time and manpower consumption in a process of searching for the user terminal caused by a location error can be reduced.

In addition, the wireless signal information is screened by using the positioning information as a constraint condition, to obtain screened wireless signal information, and a roadside positioning result is determined in combination with the positioning information of the user terminal based on the screened wireless signal information. A data amount of the screened wireless signal information is reduced, thereby reducing the processing pressure of the user terminal, and saving a processing overhead of the user terminal.

The roadside positioning result is determined above based on the roadside positioning model. In certain embodiment(s), the user terminal may also determine the roadside positioning result without according to the roadside positioning model.

In this embodiment of the present disclosure, after the above positioning information and the above wireless signal information are obtained, the user terminal determines a road on which the user terminal is located based on the positioning information, and determines the roadside positioning result of the user terminal based on the wireless signal information. The wireless signal information includes a correspondence between identification information of at least one group of wireless transmission apparatuses and signal strength information.

In certain embodiment(s), after a target road on which the user terminal is located is determined, the user terminal screens the wireless signal information based on the signal strength information, to obtain target wireless signal information. The target wireless signal information includes wireless signal information whose signal strengths indicated by the signal strength information are greater than a target value. Further, a first quantity value and a second quantity value are determined according to identification information of wireless transmission apparatuses included in the target wireless signal information. The first quantity value is a quantity of wireless transmission apparatuses located on a first roadside of the target road, and the second quantity value is a quantity of wireless transmission apparatuses located on a second roadside of the target road. Then, the first quantity value and the second quantity value are compared. If the first quantity value is greater than the second quantity value, it is determined that the user terminal is located on the first roadside. If the first quantity value is less than the second quantity value, it is determined that the user terminal is located on the second roadside.

In certain embodiment(s), after the target road on which the user terminal is located is determined, the user terminal classifies, based on the identification information of the wireless transmission apparatuses, the wireless signals in the wireless signal information, to obtain first wireless signal information from a first roadside of the target road and second wireless signal information from a second roadside of the target road. Then, summation is respectively performed on signal strength information in the first wireless signal information and signal strength information in the second wireless signal information, to obtain first signal strength information corresponding to the first wireless signal information and second signal strength information corresponding to the second wireless signal information. The first signal strength information is used for indicating a sum of signal strengths of wireless signals transmitted by wireless transmission apparatuses from the first roadside of the target road, and the second signal strength information is used for indicating a sum of signal strengths of wireless signals transmitted by wireless transmission apparatuses from the second roadside of the target road. Further, the first signal strength information and the second signal strength information are compared. If a signal strength indicated by the first signal strength information is greater than a signal strength indicated by the second signal strength information, it is determined that the user terminal is located on the first roadside. If the signal strength indicated by the first signal strength information is less than the signal strength indicated by the second signal strength information, it is determined that the user terminal is located on the second roadside.

In certain embodiment(s), after the above positioning information and the above wireless signal information are obtained, the user terminal may use the positioning information as a constraint condition, and screen the wireless signal information based on the identification information of the wireless transmission apparatuses or the signal strength information in the wireless signal information, to obtain screened wireless signal information; and determine the roadside positioning result of the user terminal in combination with the above positioning information based on the screened wireless signal information.

In certain embodiment(s), the user terminal may determine the roadside on which the user terminal is located based on signal strength information in the screened wireless signal information. Exemplarily, when screening the above wireless signal information, the user terminal determines distances between the wireless transmission apparatuses and the user terminal in combination with the positioning information based on the identification information of the wireless transmission apparatuses, to use wireless signal information whose distances are greater than a threshold value as the screened wireless signal information. In this case, if the screened wireless signal information includes the wireless signal information of the first roadside and the wireless signal information of the second roadside corresponding to the target road, when the signal strength indicated by the wireless signal information of the first roadside is greater than the signal strength indicated by the wireless signal information of the second roadside, the roadside positioning result of the user terminal is determined as the first roadside of the target road. In an exemplary embodiment, if the screened wireless signal information includes the wireless signal information of the first roadside corresponding to the target road but does not include the wireless signal information of the second roadside corresponding to the target road, the roadside positioning result of the user terminal is determined as the second roadside of the target road.

In certain embodiment(s), the user terminal may determine the roadside on which the user terminal is located based on signal strength information included in the screened wireless signal information. Exemplarily, when screening the wireless signal information, the user terminal selects wireless signal information corresponding to wireless signals whose signal strengths are greater than a specific value as the screened wireless signal information. In this case, if the screened wireless signal information includes the wireless signal information of the first roadside corresponding to the target road but does not include the wireless signal information of the second roadside corresponding to the target road, the roadside positioning result of the user terminal is determined as the first roadside of the target road. In an exemplary embodiment, in this case, if the screened wireless signal information includes the wireless signal information of the first roadside and the wireless signal information of the second roadside corresponding to the target road, when the signal strength indicated by the wireless signal information of the first roadside is greater than the signal strength indicated by the wireless signal information of the second roadside, the roadside positioning result of the user terminal is determined as the first roadside of the target road.

The roadside positioning is described above by using the user terminal as the execution entity. In certain embodiment(s), execution entities of the above steps may also be a server, such as a background server of the target application. This is not limited in this embodiment of the present disclosure.

The roadside positioning method is described above by using the execution entities of the steps as the same device, and a method in which the roadside positioning result is determined by interaction of the user terminal and the server is described below.

Figure 4:
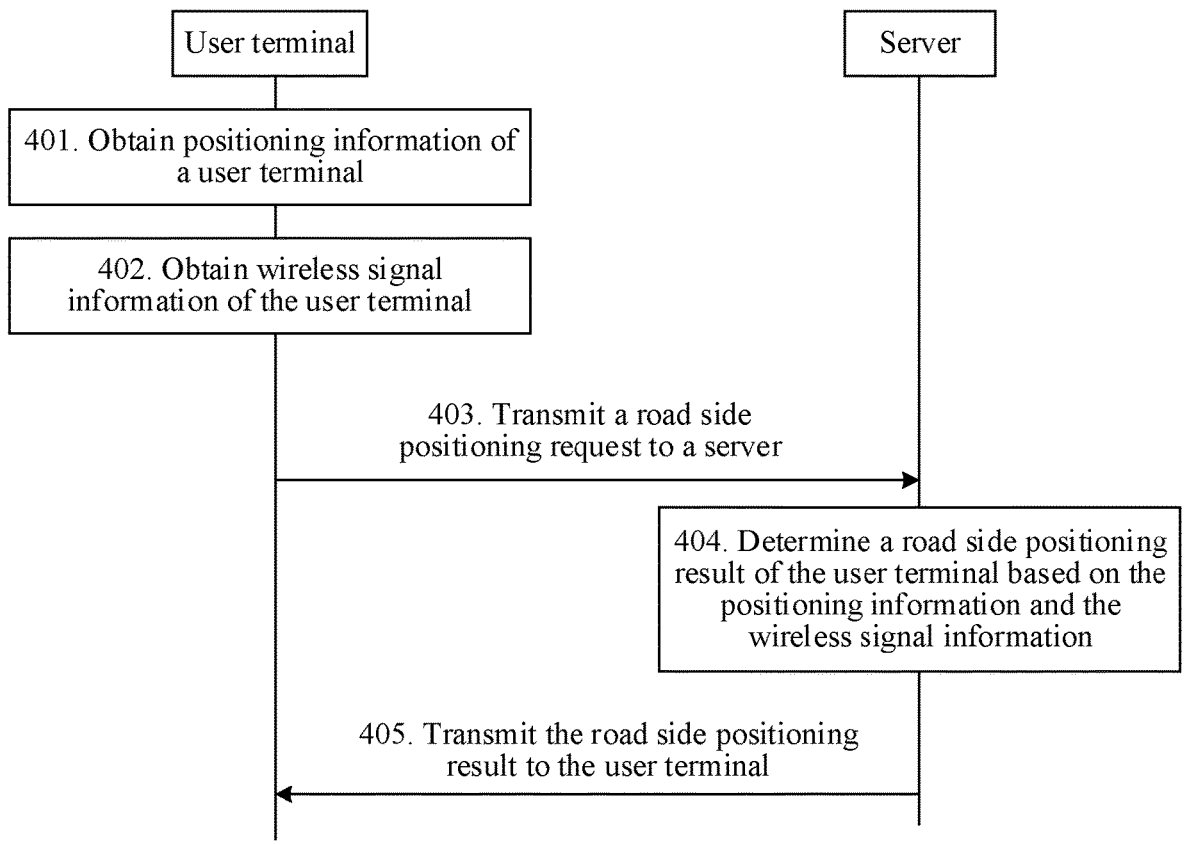
FIG. 4 is a schematic flowchart of a roadside positioning method according to certain embodiment(s) of the present disclosure.

FIG. 4 is a flowchart of a roadside positioning method according to another embodiment of the present disclosure. The method may include the following steps (401 to 405):

Step 401. A user terminal obtains positioning information of the user terminal.

The positioning information is used for indicating a geographic location of the user terminal. In certain embodiment(s), the positioning information may include specific location information for indicating that the user terminal is located on the location, or may include a location range for indicating that the user terminal may be located on a specific location of the location range.

In this embodiment of the present disclosure, when a positioning execution request is detected, the user terminal obtains the positioning information of the user terminal. The positioning execution request is used for obtaining the positioning information of the user terminal. In certain embodiment(s), the positioning execution request is generated by triggering of a user. In certain embodiment(s), after an enabling instruction for a positioning permission is detected, the user terminal generates the above positioning execution request, and obtains and stores the positioning information of the user terminal in real time, to facilitate subsequent use of the positioning information of the user terminal. In certain embodiment(s), after a start instruction for a target application is detected, the user terminal generates the above positioning execution request, and obtains the positioning information of the user terminal. The above target application is any application with a positioning function. In actual application, the user terminal may also generate the positioning execution request and obtain the positioning information of the user terminal after an operation instruction (such as a click instruction) for a positioning icon is detected.

In certain embodiment(s), the user terminal may obtain the positioning information of the user terminal through a positioning system such as a GPS. The positioning information of the user terminal may include latitude and longitude information of the user terminal. In certain embodiment(s), the latitude and longitude information may be latitude and longitude information of a specific location for indicating a specific geographic location of the user terminal. Alternatively, the latitude and longitude information may be latitude and longitude information of a specific location range for indicating a geographic range in which the user terminal may be located.

Step 402. The user terminal obtains wireless signal information of the user terminal.

The wireless signal information is used for indicating wireless signals acquired by the user terminal at the geographic location, such as a base station signal, and a WiFi signal. The geographic location may be a geographic location indicated by the above positioning information, or may be a real-time geographic location of the user terminal in a movement process. In certain embodiment(s), the wireless signal information may include a correspondence between identification information of at least one group of wireless transmission apparatuses and signal strength information. The identification information of the wireless transmission apparatuses is used for uniquely identifying wireless transmission apparatuses, and the signal strength information is used for indicating signal strengths of wireless signals.

In this embodiment of the present disclosure, after the positioning information of the above user terminal is obtained, a computing device obtains the wireless signal information of the user terminal. Alternatively, the user terminal may also obtain the wireless signal information of the user terminal when obtaining the above positioning information. Exemplarily, to help ensure the real-time performance of the positioning information and the wireless signal information, the user terminal may obtain the positioning information and the wireless signal information according to a specific time interval. In certain embodiment(s), the user terminal may obtain the above wireless signal information according to a signal detector disposed in the user terminal.

Step 403. The user terminal transmits a roadside positioning request to a server.

The roadside positioning request is used for requesting the server to obtain a roadside positioning result. The roadside is a side of a road. In certain embodiment(s), the road includes two sides, and the roadside positioning result is used for indicating which one of the two sides of the road on which the user terminal is located. The roadside positioning request includes the positioning information and the wireless signal information. In this embodiment of the present disclosure, after the above positioning information and wireless signal information are obtained, the user terminal generates the above roadside positioning request according to the positioning information and the wireless signal information, and transmits the roadside positioning request to the server. Correspondingly, the server receives the roadside positioning request.

In this embodiment of the present disclosure, if the above user terminal is in a moving state, the user terminal needs to obtain the positioning information and the wireless signal information in real time, and transmit the positioning information and the wireless signal information obtained in real time to the server after the above roadside positioning request is transmitted to the server. In certain embodiment(s), after the positioning information and the wireless signal information obtained in real time are received, the server may use the positioning information and the wireless signal information obtained in real time to cover historical positioning information and historical wireless signal information, thereby realizing information updating. Alternatively, the server may also store the positioning information and the wireless signal information obtained in real time, the historical positioning information, and the historical wireless signal information simultaneously. The historical positioning information is positioning information of the user terminal obtained by the server before receiving the above positioning information obtained in real time, and the historical wireless signal information is wireless signal information of the user terminal obtained by the server before receiving the above wireless signal information obtained in real time.

Step 404. The server determines the roadside positioning result of the user terminal based on the positioning information and the wireless signal information.

The server is used for obtaining the roadside positioning result according to the positioning information and the wireless signal information. In certain embodiment(s), a roadside positioning model is disposed in the server. The roadside positioning model is a machine learning model configured to determine the roadside positioning result. In certain embodiment(s), the server may determine the roadside positioning result of the user terminal by the roadside positioning model according to the positioning information and the wireless signal information.

The roadside positioning result is used for indicating the roadside on which the user terminal is located. In certain embodiment(s), the above roadside positioning result may include location information of which one of the two sides of the road, or may include the roadside feature. This is not limited in this embodiment of the present disclosure. In this embodiment of the present disclosure, after the above positioning information and wireless signal information are obtained, the server determines the roadside positioning result of the above user terminal based on the positioning information and the wireless signal information.

If the user terminal is in the moving state, the above positioning information may be the above positioning information obtained in real time, or may be the above positioning information obtained in real time and the historical positioning information. This is not limited in this embodiment of the present disclosure. In certain embodiment(s), when the user terminal is in the moving state, the above wireless signal information may be the above wireless signal information obtained in real time, or may be the above wireless signal information obtained in real time and the historical wireless signal information. This is not limited in this embodiment of the present disclosure.

In certain embodiment(s), if the user terminal is in the moving state, to avoid a roadside positioning result caused by an excessive movement distance of the user terminal, the server screens, after the positioning information obtained in real time and the wireless signal information obtained in real time are received, the historical wireless signal information and the wireless signal information obtained in real time according to the positioning information obtained in real time, to obtain screened wireless signal information, and obtains the roadside positioning result of the user terminal in combination with the above positioning information according to the screened wireless signal information.

In certain embodiment(s), in this embodiment of the present disclosure, the server may invoke the roadside positioning model to obtain the roadside positioning result of the user terminal. In certain embodiment(s), after the above positioning information and wireless signal information are obtained, the server inputs the positioning information and the wireless signal information to the roadside positioning model, to obtain the roadside positioning result outputted by the roadside positioning model. In certain embodiment(s), after the above positioning information and wireless signal information are obtained, the server screens the wireless signal information, to obtain the screened wireless signal information, and determines the roadside positioning result used for the terminal in combination with the above positioning information according to the screened wireless signal information.

Step 405. The server transmits the roadside positioning result to the user terminal.

In this embodiment of the present disclosure, after the above roadside positioning result is obtained, the server transmits the roadside positioning result to the user terminal. Correspondingly, the user terminal receives the roadside positioning result of the user terminal from the server. In certain embodiment(s), if the user terminal is in the moving state, after the above positioning information and wireless signal information obtained in real time are received, the server updates the roadside positioning result, and transmits updated roadside positioning result to the user terminal.

In certain embodiment(s), after the above roadside positioning result is obtained, the user terminal may display label information in a positioning result display interface based on the positioning information of the roadside. The positioning result display interface is used for displaying the geographic location of the above user terminal. In certain embodiment(s), the positioning result display interface may include a map display picture, and the user terminal displays the geographic location of the user terminal to the user by labeling the map display picture. Alternatively, the user terminal may also display latitude and longitude information of the location of the user terminal in the positioning result display interface, to display the geographic location of the user terminal.

Figure 5:
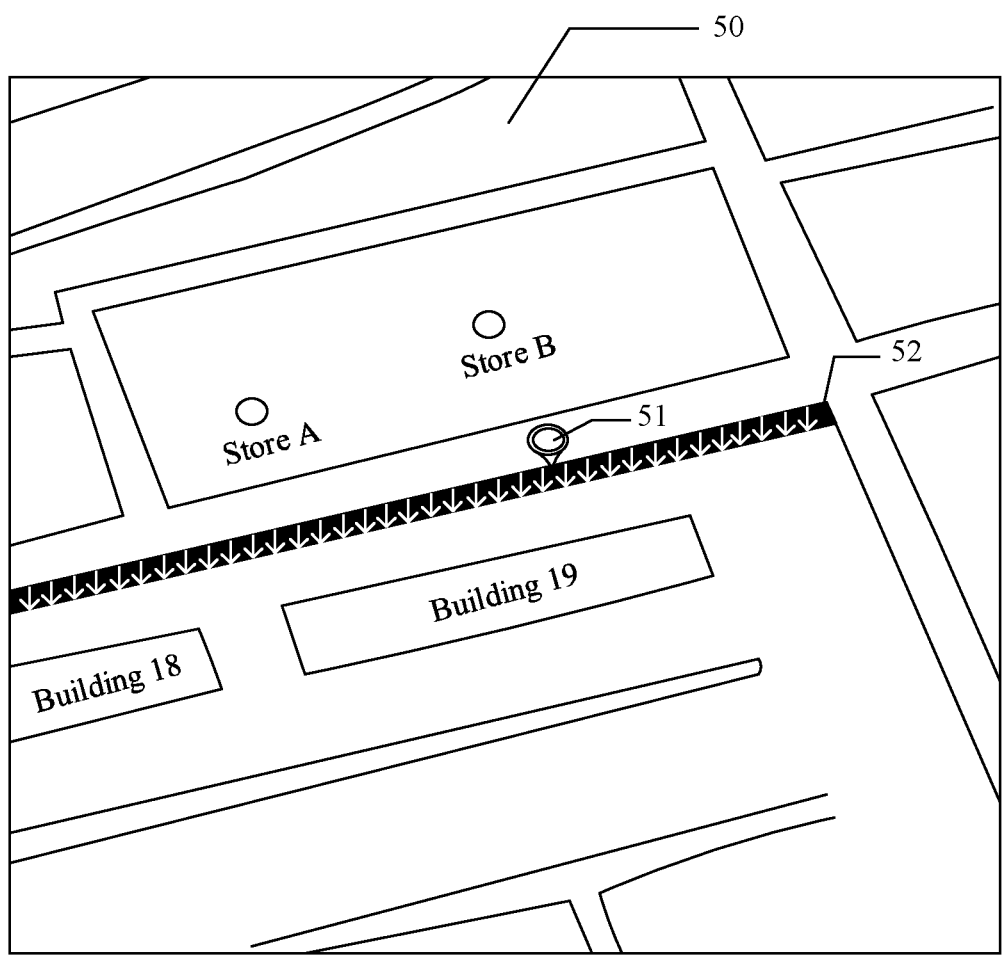
FIG. 5 is an exemplary schematic diagram of a positioning result display interface.

In certain embodiment(s), after the above roadside positioning result is received, the user terminal labels, in the above positioning result display interface based on the roadside positioning result, a roadside of a target road on which the user terminal is located. Exemplarily, with reference to FIG. 5, a user terminal icon 51 is displayed in a positioning result display interface 50, and a roadside 52 of a target road on which the user terminal is located is labeled.

In certain embodiment(s), after the above roadside positioning result is received, the user terminal determines the roadside of the target road on which the user terminal is located, to determine the geographic location of the user terminal, and display the geographic location of the user terminal in the positioning result display interface. For example, the user terminal may display a positioning icon in the map display picture, so that the user can determine the geographic location of the user terminal through a display location of the user terminal icon.

In summary, in the technical solutions provided in this embodiment of the present disclosure, by calibrating positioning information of a user terminal through wireless signal information, a more desirable positioning result is obtained, and a roadside on which the user terminal is located is determined, thereby improving roadside positioning. Moreover, in the obtaining process of the roadside positioning result, the terminal and a server perform different steps respectively, to avoid an excessive load on the terminal or the server, and reduce processing overheads of the terminal and the server.

In addition, after the roadside positioning result is obtained, the user terminal labels the roadside on which the user terminal is located in a positioning result display interface, so that a user can intuitively observe the roadside on which the user terminal is located in the positioning result display interface, and a zoom-in operation for observing the roadside on which the user terminal is located in the positioning result display interface is avoided, thereby simplifying user operations.

The method provided in the present disclosure is the roadside positioning method. Therefore, in this embodiment of the present disclosure, after the positioning information of the above user terminal is received, the user terminal may determine whether the user terminal is located on the roadside of the target road based on the positioning information of the user terminal, to determine whether to obtain the roadside positioning result of the user terminal.

In an exemplary embodiment, after step 301 (step 401), the method further includes the following substeps.

1. Determine, according to the positioning information, an environment in which the user terminal is located.
2. Obtain, when or in response to determining that the environment in which the user terminal is located is the roadside of the target road, the wireless signal information of the user terminal.

The target road is any roadside on which the user terminal is located. In this embodiment of the present disclosure, after the positioning information of the above user terminal is obtained, the user terminal determines the environment in which the user terminal is located according to the positioning information. If the environment in which the user terminal is located is the roadside of the target road, a width of the target road is obtained. The above width is a sum of widths of lanes of the above target road. When or in response to determining that the width is less than a threshold, the user terminal obtains the wireless signal information of the user terminal, and determines the roadside positioning result according to the wireless signal information and the positioning information. The threshold is determined based on a positioning error of the positioning information. For example, if an upper limit value of the positioning error of the positioning information is 10 m, the threshold may be less than or equal to 10 m.

In certain embodiment(s), if the user terminal determines, according to the above positioning information, that the environment in which the user terminal is located includes more than one road (for example, the user terminal is located on a crossroad), the user terminal may the target road according to the historical positioning information of the user terminal. For example, if the user terminal determines a movement direction of the user terminal as a north-south direction according to the historical positioning information, the user terminal determines a road of a north-south orientation as the target road. If the user terminal determines a movement direction of the user terminal as an east-west direction according to the historical positioning information, the user terminal determines a road of an east-west orientation as the target road.

Figure 6:
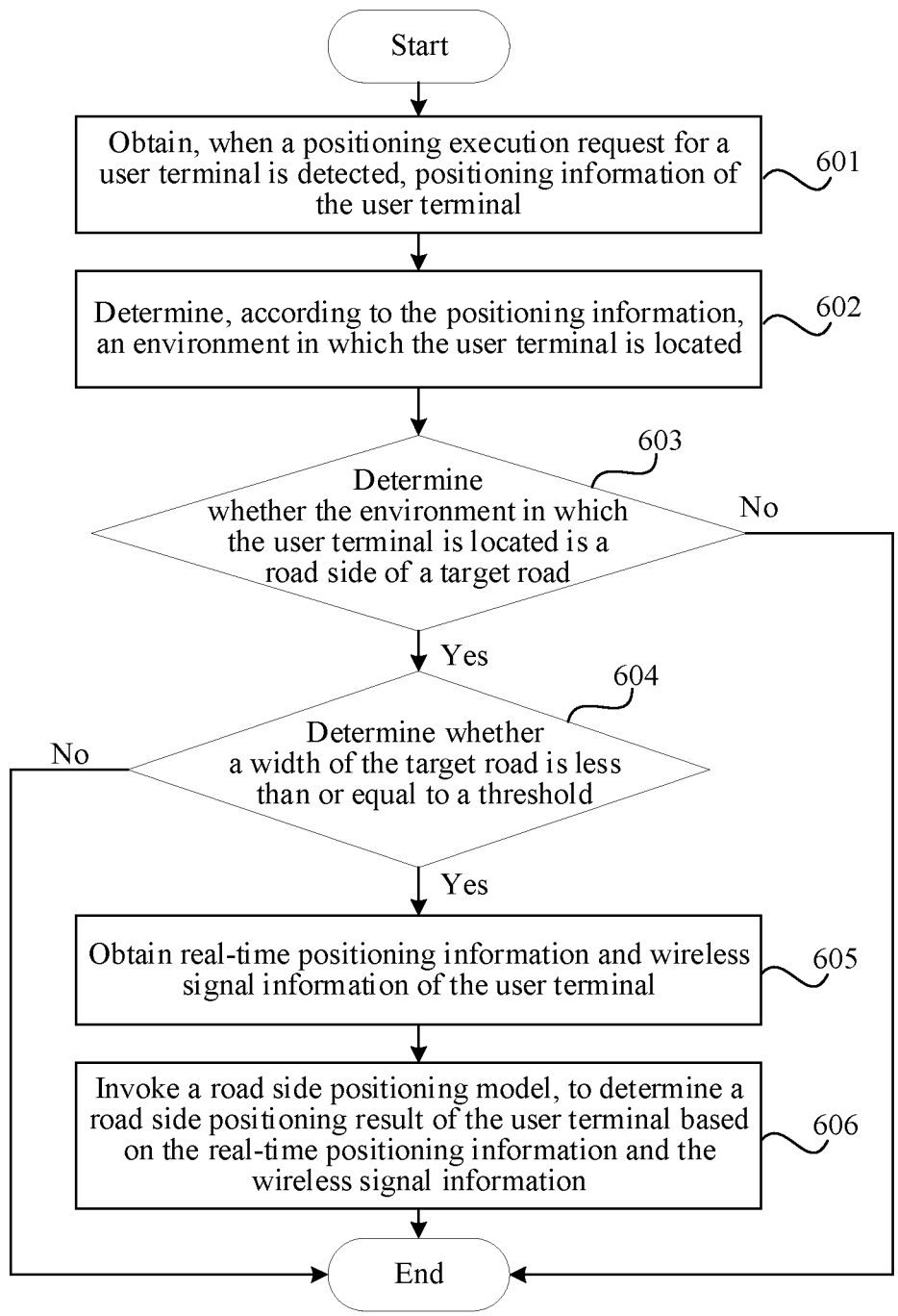
FIG. 6 is an exemplary schematic diagram of a roadside positioning method.

Exemplarily, the roadside positioning method in the present disclosure is described below with reference to FIG. 6.

Step 601. Obtain, when or in response to determining that a positioning execution request for a user terminal is detected, positioning information of the user terminal. The positioning information is used for indicating a geographic location of the user terminal.

Step 602. Determine, according to the positioning information, an environment in which the user terminal is located.

Step 603. Determine whether the environment in which the user terminal is located is a roadside of a target road. If the environment in which the user terminal is located is the roadside of the target road, perform step 604. If the environment in which the user terminal is located is not the roadside of the target road, end the process.

Step 604. Determine whether a width of the target road is less than or equal to a threshold. If the width of the target road is less than or equal to the threshold, perform step 605. If the width of the target road is greater than the threshold, end the process.

Step 605. Obtain real-time positioning information and wireless signal information of the user terminal. In certain embodiment(s), if the user terminal is not in a moving state, the real-time positioning information is the same as the above positioning information. If the user terminal is in the moving state, the real-time positioning information is different from the above positioning information.

Step 606. Invoke a roadside positioning model, to determine a roadside positioning result of the user terminal based on the real-time positioning information and the wireless signal information.

Figure 7:
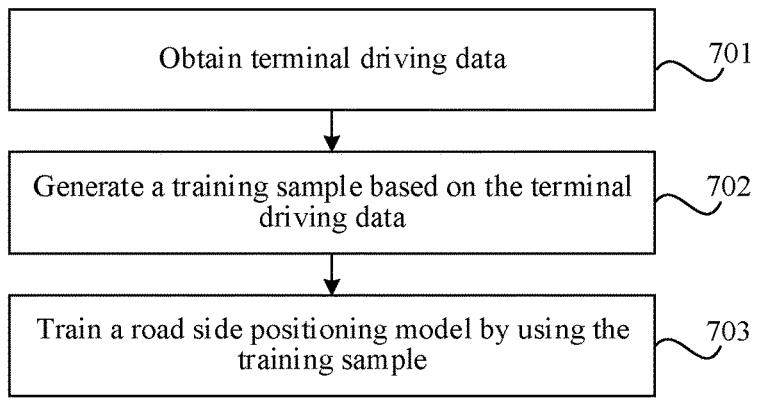
FIG. 7 is a schematic flowchart of a method for training a roadside positioning model according to certain embodiment(s) of the present disclosure.

FIG. 7 is a flowchart of a method for training a roadside positioning model according to an embodiment of the present disclosure. The method may be applied to a computing device. For example, an execution entity of each step may be the model training device 40 in the system for training a roadside positioning model shown in FIG. 2. The method may include the following steps (701 to 703):

Step 701. Obtain terminal driving data.

The terminal driving data is used for indicating driving information of a sample terminal. In certain embodiment(s), the terminal driving data is data acquired by the model training device in a driving process of the sample terminal, and the terminal driving data may include positioning information and wireless signal information of the sample terminal. The positioning information is used for indicating a geographic location of the sample terminal, and the wireless signal information is used for indicating wireless signals acquired by the sample terminal at the geographic location. In certain embodiment(s), the wireless signal information includes a correspondence between identification information of at least one group of wireless transmission apparatuses and signal strength information.

In this embodiment of the present disclosure, the model training device may obtain the above terminal driving data based on a target application. In certain embodiment(s), when the sample terminal moves on a sample road, if the above target application runs in the foreground or waits in the background, and the target application has a permission of obtaining the positioning information and the wireless signal information of the sample terminal, the sample terminal may obtain the positioning information and the wireless signal information of the sample terminal in real time, generate the terminal driving data according to the positioning information and the wireless signal information, and transmit the terminal driving data to the model training device. Correspondingly, the model training device obtains the terminal driving data form the sample terminal.

In certain embodiment(s), to help ensure the real-time performance of the terminal driving data, the sample terminal may provide new terminal driving data for the model training device according to a specific time interval.

The above sample road may be any road, or may be a road selected by the model training device according to a specific condition, for example, a road of a region. This is not limited in this embodiment of the present disclosure.

Step 702. Generate a training sample based on the terminal driving data.

The training sample is used for training the roadside positioning model. In certain embodiment(s), the training sample may include sample data and label data. The sample data of the training sample includes the positioning information and the wireless signal information of the sample terminal, the label data of the training sample includes a label value of a roadside positioning result of the sample terminal, and the roadside positioning result is used for indicating a roadside on which the sample terminal is located.

In this embodiment of the present disclosure, after the above terminal driving data is obtained, the model training device generates the training sample based on the terminal driving data. In certain embodiment(s), the above terminal driving data further includes movement information of the sample terminal, and the movement information is used for indicating a movement direction of the sample terminal in the sample road. In certain embodiment(s), the model training device may determine the label data of the training sample according to the above movement information. In certain embodiment(s), Step 702 includes the following steps:

1. Determine, based on an orientation of the sample road and the movement direction of the sample terminal on the sample road, the label value of the roadside positioning result of the sample terminal.

The movement direction is a movement orientation of the sample terminal, and the movement direction may be determined by the model training device according to the movement information in the above terminal driving data. In certain embodiment(s), the movement information includes movement orientation data detected and obtained by an acceleration sensor of the sample terminal. In certain embodiment(s), after the above terminal driving data is obtained, the model training device obtains the movement orientation data of the sample terminal based on the terminal driving data, to determine the movement direction of the sample terminal on the sample road. In certain embodiment(s), the movement information includes historical positioning information of the sample terminal. In certain embodiment(s), after the above terminal driving data is obtained, the model training device obtains the historical positioning information of the sample terminal based on the terminal driving data, to determine the movement direction of the sample terminal on the sample road according to the historical positioning information.

In this embodiment of the present disclosure, after the movement direction of the sample terminal on the sample road is determined, the model training device determines the roadside positioning result of the sample terminal based on the movement direction and the orientation of the sample road, to determine the label value of the roadside positioning result. The label value is a value used for indicating the above roadside positioning result. In certain embodiment(s), the model training device may determine, according to the orientation of the sample road and the movement direction of the sample terminal on the sample road, that the roadside positioning result of the sample terminal is that the sample terminal is located on a left (right) side or an upper (lower) side of the sample road, to determine the label value of the roadside positioning result of the sample terminal. The above label value may be any data. This is not limited in this embodiment of the present disclosure. For example, if the roadside positioning result of the sample terminal is that the sample terminal is located on the left side or upper side of the sample road, the label value may be 0. If the roadside positioning result of the sample terminal is that the sample terminal is located on the right side or lower side of the sample road, the label value may be 1.

Figure 8:
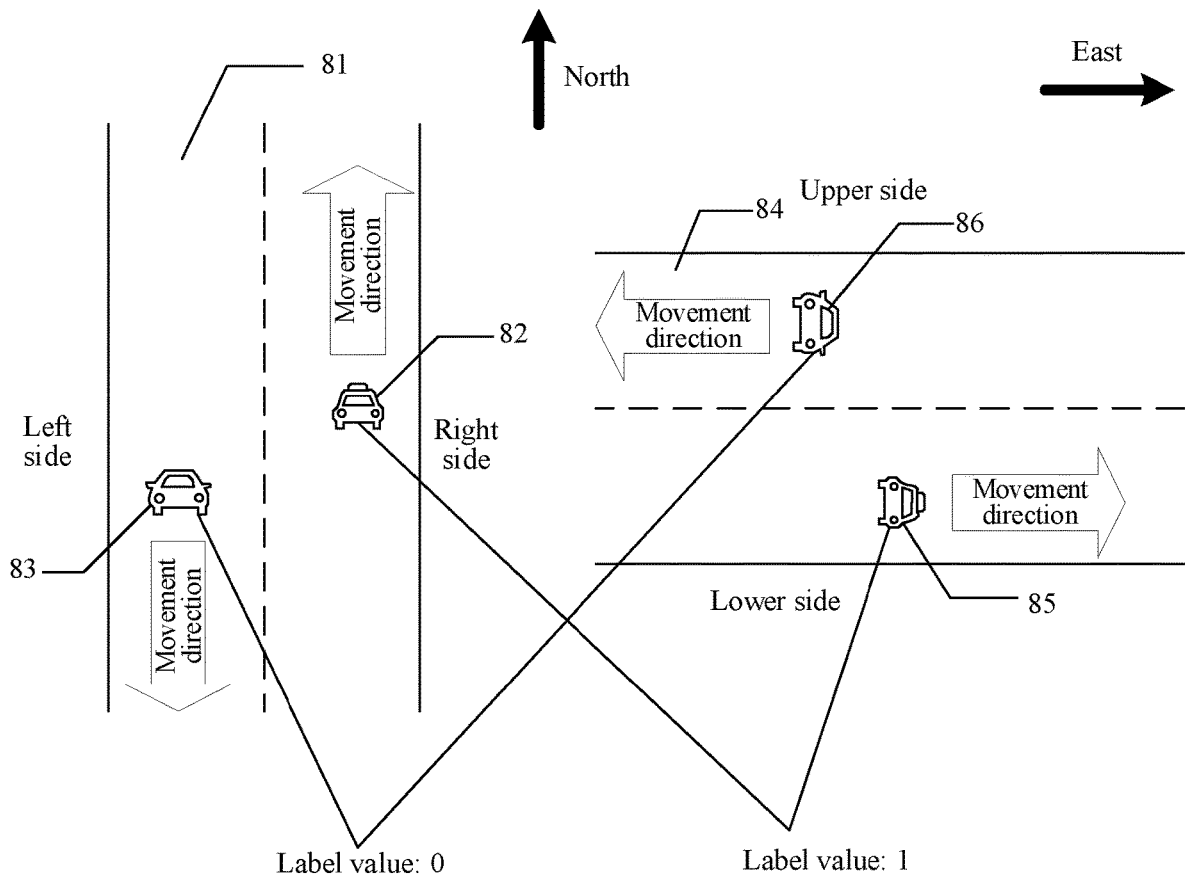
FIG. 8 is an exemplary schematic diagram of a label value determining method.

Exemplarily, with reference to FIG. 8, on a sample road 81 of a north-south orientation, if the model training device determines that a movement direction of a first sample terminal 82 is north, the model training device determines that a roadside positioning result of the first sample terminal 82 is that the first sample terminal 82 is located on a right side of the sample road 81 of the north-south orientation, and a label value of the first sample terminal 82 is 1. If the model training device determines that a movement direction of a second sample terminal 83 is south, the model training device determines that a roadside positioning result of the second sample terminal 83 is that the second sample terminal 83 is located on a left side of the sample road 81 of the north-south orientation, and a label value of the second sample terminal 83 is 0. In a sample road 84 of an east-west orientation, if the model training device determines that a movement direction of a third sample terminal 85 is east, the model training device determines that a roadside positioning result of the third sample terminal 85 is that the third sample terminal 85 is located on a lower side of the sample road 84 of the east-west orientation, and a label value of the third sample terminal 85 is 1. If the model training device determines that a movement direction of a fourth sample terminal 86 is west, the model training device determines that a roadside positioning result of the fourth sample terminal 86 is that the fourth sample terminal 86 is located on an upper side of the sample road 84 of the north-south orientation, and a label value of the fourth sample terminal 86 is 0.

In certain embodiment(s), due to different driving rules in different regions, after the above terminal driving data is obtained, the model training device may obtain a driving rule of the region, and determine a correspondence between the orientation and the movement direction of the road according to the driving rule, to determine the label value of the roadside positioning result of the sample terminal based on the orientation of the sample road and the movement direction of the sample terminal on the sample road.

2. Generate the training sample by using the positioning information and the wireless signal information of the sample terminal as the sample data and by using the label value of the roadside positioning result of the sample terminal as the label data.

In this embodiment of the present disclosure, after the above label value is determined, the model training device generates the training sample by using the positioning information and the wireless signal information of the sample terminal as the sample data and by using the label value of the roadside positioning result of the sample terminal as the label data.

The above wireless signal information includes a correspondence between identification information of at least one group of wireless transmission apparatuses and signal strength information. The identification information is used for uniquely identifying the wireless transmission apparatuses. Different wireless transmission apparatuses have different identification information, and the model training device may determine locations of the wireless transmission apparatuses according to the identification information. The signal strength information is used for indicating strengths of wireless signals, and the model training device may estimate distances between the wireless signal transmission apparatuses and the sample terminal according to the signal strength information.

Figure 9:
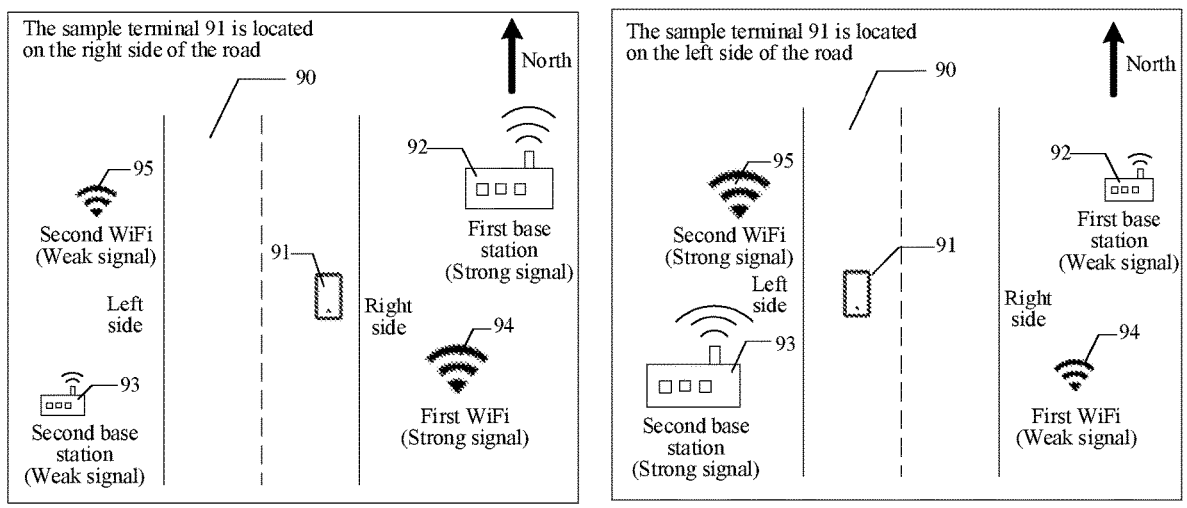
FIG. 9 is an exemplary schematic diagram of wireless signal strengths on different locations.

Due to the influence of the distances of the wireless signal transmission apparatuses on the wireless signal strengths, when the sample terminal is located on different locations, correspondences between the identification information and the signal strength information of the wireless transmission apparatuses are different. Exemplarily, with reference to FIG. 9, on a sample road 90 of a north-south orientation, if the sample terminal 91 is located on a right side of the road, a signal strength corresponding to identification information of a first base station 92 is relatively strong, a signal strength corresponding to identification information of a second base station 93 is weak, a signal strength corresponding to a first WiFi 94 is relatively strong, and a signal strength corresponding to a second WiFi 95 is weak. If the sample terminal 91 is located on a left side of the sample road 90, the signal strength corresponding to the identification information of the first base station 92 is weak, the signal strength corresponding to the identification information of a second base station 93 is relatively strong, the signal strength corresponding to the first WiFi 94 is weak, and the signal strength corresponding to the second WiFi 95 is relatively strong.

Step 703. Train a roadside positioning model by using the training sample.

In this embodiment of the present disclosure, after the above training sample is obtained, the model training device trains the roadside positioning model by using the training sample. In certain embodiment(s), the roadside positioning model includes an input layer, a feature extraction layer, and a classifier. The input layer is configured to input the sample data of the training sample, the feature extraction layer is configured to extract feature information of the sample data of the training sample, and the classifier is configured to output a predicted value of the roadside positioning result of the sample terminal based on the feature information.

In certain embodiment(s), in this embodiment of the present disclosure, after the model training device obtains the above training sample, the input layer inputs the sample data of the training sample, the feature extraction layer extracts the corresponding feature information based on the sample data, and then the classifier outputs the predicted value of the roadside positioning result of the sample terminal based on the feature information. Then, by using the above label value as an actual value, the model training device calculates a loss function of the roadside positioning model according to the actual value and the predicted value. If the loss function is too large, parameters of the roadside positioning model are adjusted, and the above sample data is inputted again to repeat the above steps, until the loss function converges, thereby determining that the training of the roadside positioning model is performed.

Figure 10:
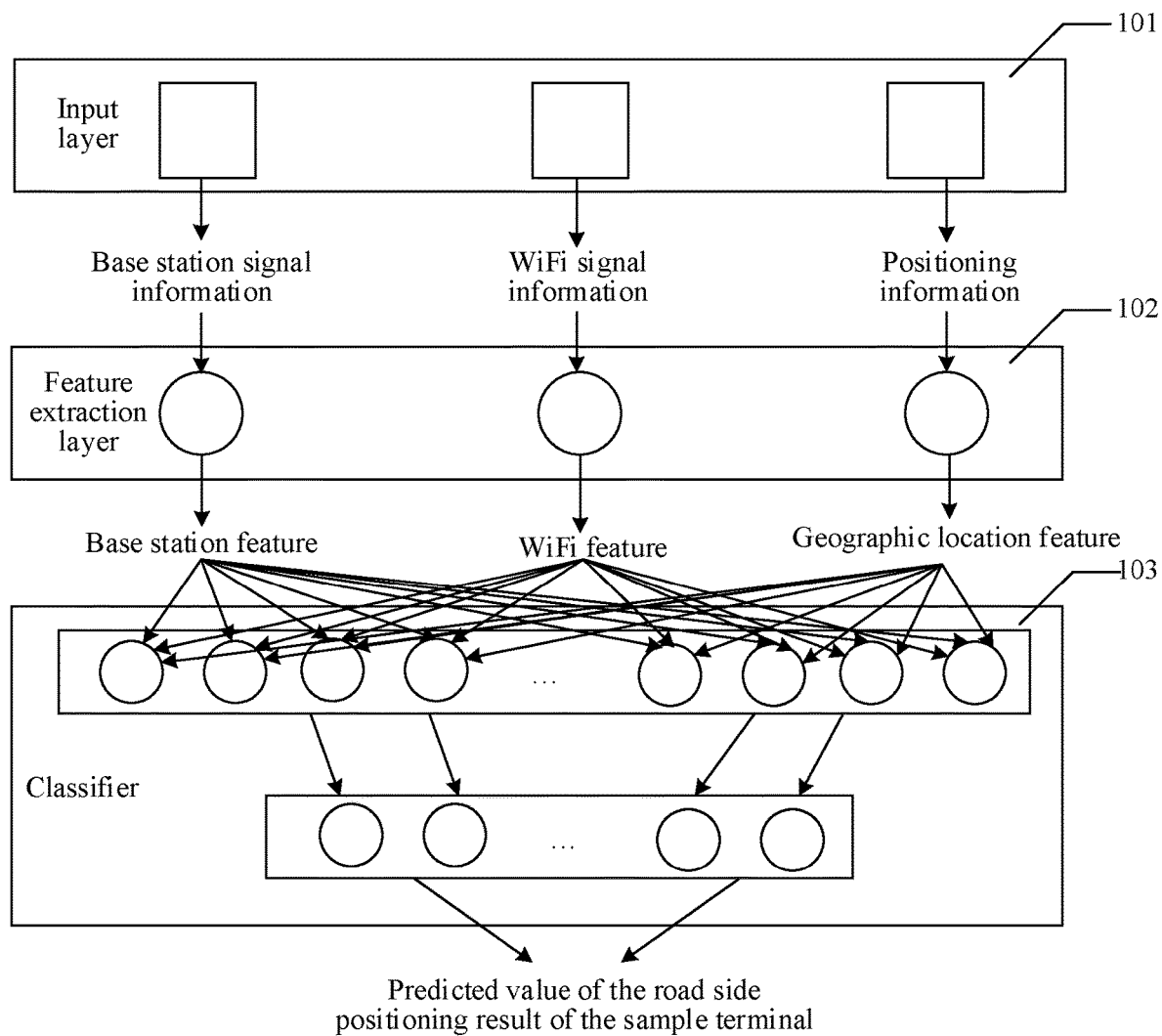
FIG. 10 is an exemplary schematic diagram of a roadside positioning model.

Exemplarily, with reference to FIG. 10, by using an example in which the wireless signal information includes base station signal information and WiFi signal information, an input layer 101 of the roadside positioning model inputs the base station signal information, the WiFi signal information, and the positioning information, a feature extraction layer 102 determines a base station feature, a WiFi feature, and a geographic location feature of the sample data based on the base station signal information, the WiFi signal information, and the positioning information, and a classifier 103 outputs the predicted value of the roadside positioning result of the sample terminal according to the base station feature, the WiFi feature, and the geographic location feature.

In summary, in the technical solutions provided in this embodiment of the present disclosure, a roadside positioning model is trained by a training sample generated by terminal driving data, and the roadside positioning model is used for indicating a roadside on which a sample terminal is located, thereby avoiding that the roadside on which the user terminal is located cannot be determined due to the positioning deviation when the road is too narrow, and improving positioning. Moreover, the training sample is generated according to the terminal driving data, and positioning information and wireless signal information in the terminal driving data are both directly obtainable information, to avoid the inconvenience of obtaining private information, and obtain a large amount of positioning information and wireless signal information when protecting user privacy. In this way, the method is easy to operate, thereby successfully obtaining a large amount of data to generate the training sample to train the roadside positioning model, and the data is sufficient, thereby ensuring model training.

In addition, label data of the training sample is determined according to a movement direction of the sample terminal and an orientation of a sample road, to avoid the consumption of human resources caused by manual detection and determination on the label data, thereby simplifying operations and reducing the consumption of human resources.

The following is an apparatus embodiment of the present disclosure, which can be used to perform the method embodiments of the present disclosure. For details not disclosed in the apparatus embodiments of the present disclosure, refer to the method embodiments of the present disclosure.

Figure 11:
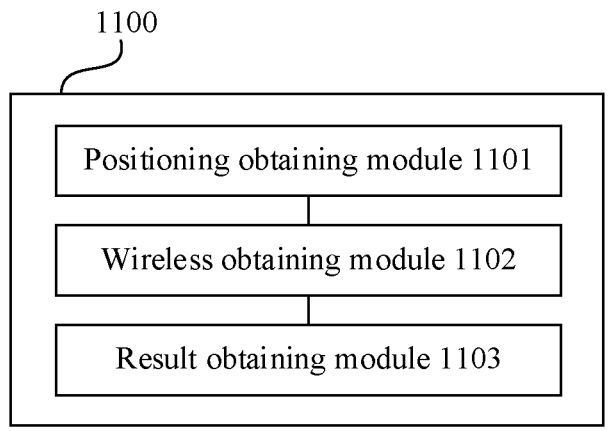
FIG. 11 is a schematic block diagram of a roadside positioning apparatus according to certain embodiment(s) of the present disclosure.

FIG. 11 is a block diagram of a roadside positioning apparatus according to an embodiment of the present disclosure. The apparatus has functions of implementing the above roadside positioning method. The functions may be implemented by hardware, or may be implemented by hardware executing corresponding software. The apparatus may be a computing device or may be disposed in a computing device. An apparatus 1100 may include: a positioning obtaining module 1101, a wireless obtaining module 1102, and a result obtaining module 1103.

The positioning obtaining module 1101 is configured to obtain positioning information of the user terminal, the positioning information being used for indicating a geographic location of the user terminal.

The wireless obtaining module 1102 is configured to obtain wireless signal information of the user terminal, the wireless signal information being used for indicating wireless signals acquired by the user terminal at the geographic location.

The result obtaining module 1103 is configured to determine a roadside positioning result of the user terminal based on the positioning information and the wireless signal information, the roadside positioning result being used for indicating a roadside on which the user terminal is located.

In an exemplary embodiment, the result obtaining module 1103 is configured to input the positioning information and the wireless signal information to a roadside positioning model, the roadside positioning model being a machine learning model configured to determine the roadside positioning result; and obtain the roadside positioning result of the user terminal outputted by the roadside positioning model.

In an exemplary embodiment, the result obtaining module 1103 is configured to transmit a roadside positioning request to a server, the roadside positioning request including the positioning information and the wireless signal information, where the server is configured to determine the roadside positioning result of the user terminal by using a roadside positioning model according to the positioning information and the wireless signal information, the roadside positioning model being a machine learning model configured to determine the roadside positioning result; and receive the roadside positioning result of the user terminal from the server.

In an exemplary embodiment, the wireless signal information includes a correspondence between identification information of at least one group of wireless transmission apparatuses and signal strength information.

In an exemplary embodiment, the result obtaining module 1103 is configured to determine, based on the positioning information, a target road on which the user terminal is located; screen the wireless signal information based on the signal strength information, to obtain target wireless signal information, where the target wireless signal information includes wireless signal information whose signal strengths indicated by the signal strength information are greater than a target value; determine a first quantity value and a second quantity value according to identification information of wireless transmission apparatuses included in the target wireless signal information, where the first quantity value is a quantity of wireless transmission apparatuses located on a first roadside of the target road, and the second quantity value is a quantity of wireless transmission apparatuses located on a second roadside of the target road; determine, when or in response to determining that the first quantity value is greater than the second quantity value, that the user terminal is located on the first roadside; and determine, when or in response to determining that the first quantity value is less than the second quantity value, that the user terminal is located on the second roadside.

In an exemplary embodiment, the result obtaining module 1103 is configured to determine, based on the positioning information, a target road on which the user terminal is located; classify, based on the identification information of the wireless transmission apparatuses, the wireless signals in the wireless signal information, to obtain first wireless signal information from a first roadside of the target road and second wireless signal information from a second roadside of the target road; respectively perform summation on signal strength information in the first wireless signal information and signal strength information in the second wireless signal information, to obtain first signal strength information corresponding to the first wireless signal information and second signal strength information corresponding to the second wireless signal information; determine, when or in response to determining that a signal strength indicated by the first signal strength information is greater than a signal strength indicated by the second signal strength information, that the user terminal is located on the first roadside; and determine, when or in response to determining that the signal strength indicated by the first signal strength information is less than the signal strength indicated by the second signal strength information, that the user terminal is located on the second roadside.

In an exemplary embodiment, as shown in FIG. 11, the apparatus 1100 further includes: an environment determining module 1105.

The environment determining module 1105 is configured to determine, according to the positioning information, an environment in which the user terminal is located.

The wireless obtaining module 1102 is further configured to perform, when or in response to determining that the environment in which the user terminal is located is a roadside of a target road, the operation of obtaining wireless signal information of the user terminal.

Figure 12:
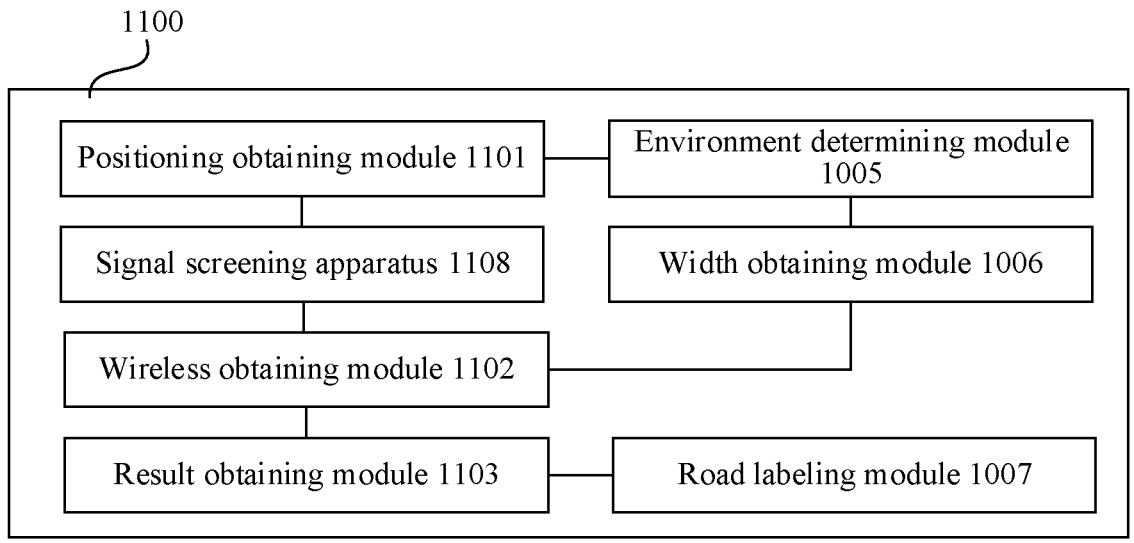
FIG. 12 is a schematic block diagram of a roadside positioning apparatus according to certain embodiment(s) of the present disclosure.

In an exemplary embodiment, as shown in FIG. 12, the apparatus 1100 further includes: a width determining module 1106.

The width determining module 1106 is configured to determine, when or in response to determining that the environment in which the user terminal is located is the roadside of the target road, a width of the target road, the width being a sum of widths of lanes of the target road.

The wireless obtaining module 1102 is further configured to perform, when or in response to determining that the width is less than a threshold, the operation of obtaining wireless signal information of the user terminal, where the threshold is determined based on a positioning error of the positioning information.

In an exemplary embodiment, as shown in FIG. 12, the apparatus 1100 further includes: a road labeling module 1107.

The road labeling module 1107 is configured to label, in a positioning result display interface based on the roadside positioning result, a roadside of a target road on which the user terminal is located.

In an exemplary embodiment, the wireless signal information includes a correspondence between identification information of at least one group of wireless transmission apparatuses and signal strength information. As shown in FIG. 12, the apparatus 1100 further includes: a signal screening apparatus 1108.

The signal screening apparatus 1108 is configured to use the positioning information as a constraint condition, and screen the wireless signal information based on the identification information of the wireless transmission apparatuses or the signal strength information, to obtain screened wireless signal information, where the screened wireless signal information is used for determining the roadside positioning result of the user terminal in combination with the positioning information. In summary, in the technical solutions provided in this embodiment of the present disclosure, by calibrating positioning information of a user terminal through wireless signal information, a more desirable positioning result is obtained, and a roadside on which the user terminal is located is determined, thereby improving roadside positioning, and avoiding that the roadside on which the user terminal is located cannot be determined due to the positioning deviation when the road is too narrow. In this way, a geographic location of the user terminal can be determined according to the positioning result, and the time and manpower consumption in a process of searching for the user terminal caused by a location error can be reduced.

Figure 13:
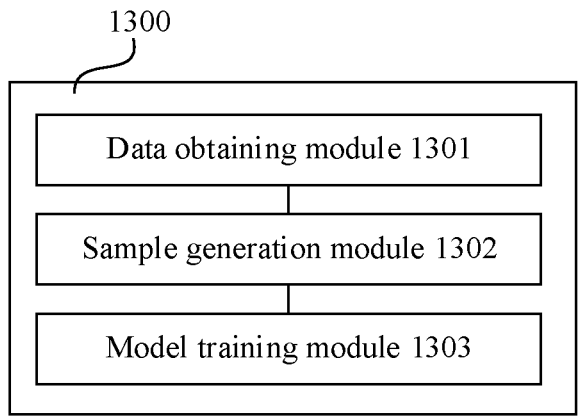
FIG. 13 is a schematic block diagram of an apparatus for training a roadside positioning model according to certain embodiment(s) of the present disclosure.

FIG. 13 is a block diagram of an apparatus for training a roadside positioning model according to an embodiment of the present disclosure. The apparatus has functions of implementing the above method for training a roadside positioning model. The functions may be implemented by hardware, or may be implemented by hardware executing corresponding software. The apparatus may be a computing device or may be disposed in a computing device. An apparatus 1300 may include: a data obtaining module 1301, a sample generation module 1302, and a model training module 1303.

The data obtaining module 1301 is configured to obtain terminal driving data, the terminal driving data including positioning information and wireless signal information of a sample terminal, the positioning information being used for indicating a geographic location of the sample terminal, and the wireless signal information being used for indicating wireless signals acquired by the sample terminal at the geographic location.

The sample generation module 1302 is configured to generate a training sample based on the terminal driving data, sample data of the training sample including the positioning information and the wireless signal information of the sample terminal, label data of the training sample including a label value of a roadside positioning result of the sample terminal, and the roadside positioning result being used for indicating a roadside on which the sample terminal is located.

The model training module 1303 is configured to train a roadside positioning model by using the training sample.

In an exemplary embodiment, the terminal driving data further includes movement information of the sample terminal, the movement information being used for indicating a movement direction of the sample terminal on a sample road. The sample generation module 1302 is configured to determine, based on an orientation of the sample road and the movement direction of the sample terminal on the sample road, the label value of the roadside positioning result of the sample terminal; and generate the training sample by using the positioning information and the wireless signal information of the sample terminal as the sample data and by using the label value of the roadside positioning result of the sample terminal as the label data.

In an exemplary embodiment, the wireless signal information includes a correspondence between identification information of at least one group of wireless transmission apparatuses and signal strength information.

In an exemplary embodiment, the roadside positioning model includes an input layer, a feature extraction layer, and a classifier, where the input layer is configured to input the sample data of the training sample; the feature extraction layer is configured to extract feature information of the sample data of the training sample; and the classifier is configured to output a predicted value of the roadside positioning result of the sample terminal based on the feature information.

In summary, in the technical solutions provided in this embodiment of the present disclosure, a roadside positioning model is trained by a training sample generated by terminal driving data, and the roadside positioning model is used for indicating a roadside on which a sample terminal is located, thereby avoiding that the roadside on which the user terminal is located cannot be determined due to the positioning deviation when the road is too narrow, and improving positioning. Moreover, the training sample is generated according to the terminal driving data, and positioning information and wireless signal information in the terminal driving data are both directly obtainable information, to avoid the inconvenience of obtaining private information, and obtain a large amount of positioning information and wireless signal information when protecting user privacy. In this way, the method is easy to operate, thereby successfully obtaining a large amount of data to generate the training sample to train the roadside positioning model, and the data is sufficient, thereby ensuring model training.

When the apparatus provided in the above embodiments implements functions of the apparatus, the division of the above functional modules is merely an example for description. In certain embodiment(s), the functions may be assigned to and performed by different functional modules, that is, the internal structure of the device is divided into different functional modules, to implement all or some of the functions described above. In addition, the apparatus and method embodiments provided in the above embodiments belong to the same concept. For the specific implementation process, reference may be made to the method embodiments, and details are not described herein again.

Figure 14:
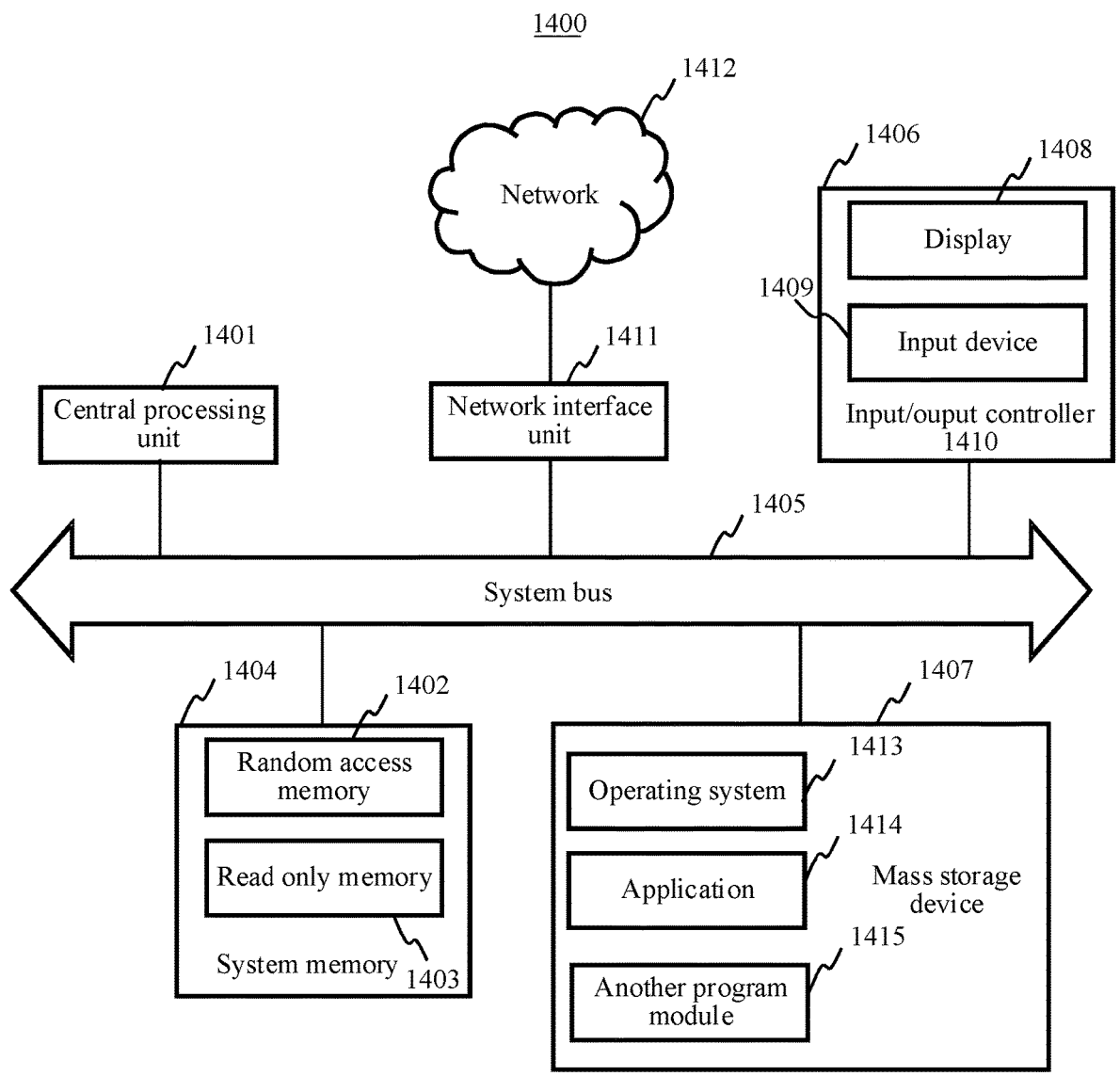
FIG. 14 is a schematic structural block diagram of a computing device according to certain embodiment(s) of the present disclosure.

FIG. 14 is a schematic block diagram of a computing device according to an embodiment of the present disclosure. The computing device may be used for implementing functions of the above roadside positioning method or method for training a roadside positioning model.

A computing device 1400 includes a central processing unit (CPU) 1401, a system memory 1404 including a random access memory (RAM) 1402 and a read only memory (ROM) 1403, and a system bus 1405 connecting the system memory 1404 to the CPU 1401. The computing device 1400 further includes an input/output system (I/O system) 1406 assisting in transmitting information between components in the computer, and a large-capacity storage device 1407 configured to store an operating system 1413, an application 1414, and another program module 1415.

The I/O system 1406 includes a display 1408 configured to display information, and an input device 1409 used by a user to input information, such as a mouse or a keyboard. The display 1408 and the input device 1409 are both connected to the CPU 1401 by using an input/output controller 1410 connected to the system bus 1405. The I/O system 1406 may further include the input/output controller 1410, to receive and process inputs from multiple other devices, such as the keyboard, the mouse, or an electronic stylus. In certain embodiment(s), the input/output controller 1410 further provides an output to a display screen, a printer, or other type of output device.

The mass storage device 1407 is connected to the central processing unit 1401 by using a mass storage controller (not shown) connected to the system bus 1405. The mass storage device 1407 and a computer-readable medium associated with the mass storage device provide non-volatile storage to the computing device 1400. That is, the mass storage device 1407 may include a computer-readable medium (not shown) such as a hard disk or a compact disc ROM (CD-ROM) drive.

Generally, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Definitely, a person skilled in art can know that the computer storage medium is not limited to the above several types. The system memory 1404 and the mass storage device 1407 may be collectively referred to as a memory.

According to the embodiments of the present disclosure, the computing device 1400 may be further connected, through a network such as the Internet, to a remote computer on the network and run. That is, the computing device 1400 may be connected to a network 1412 by using a network interface unit 1411 connected to the system bus 1405, or may be connected to another type of network or a remote computer system (not shown) by using a network interface unit 1411.

The memory further includes a computer program. The computer program is stored in the memory and configured to be executed by one or more processors, to implement the above roadside positioning method, or the above method for training a roadside positioning model.

In an exemplary embodiment, a computer-readable storage medium is further provided, storing at least one instruction, at least one program, a code set, or an instruction set, the at least one instruction, the at least one program, the code set, or the instruction set, when executed by a processor, implementing the above roadside positioning method, or implementing the above method for training a roadside positioning model.

In certain embodiment(s), the computer-readable storage medium may include: a read only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product or a computer program is provided. The computer program product or the computer program includes computer instructions, and the computer instructions are stored in a computer-readable storage medium. A processor of a computing device reads the computer instructions from the computer-readable storage medium, and executes the computer instructions, to cause the computing device to perform the above roadside positioning method, or implement the method for training a roadside positioning model.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In certain embodiment(s), the term "plurality" means two or more. And/or describes an association relationship for describing associated objects and represents that three relationships may exist. For example, A and/or B may represent the following three cases: Only A exists, both A and B exist, and only B exists. In certain embodiment(s), the character "/" indicates an "or" relationship between the associated objects. In addition, the step numbers described in the present disclosure exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in this embodiment of the present disclosure.

The above descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A roadside positioning method, performed by a user terminal, the method comprising:
    obtaining positioning information of the user terminal, the positioning information being used for indicating a geographic location of the user terminal;
    obtaining wireless signal information of the user terminal, the wireless signal information being used for indicating wireless signals acquired by the user terminal at the geographic location; and
    determining a roadside positioning result of the user terminal based on the positioning information, the wireless signal information, and a roadside positioning model, the roadside positioning result being used for indicating a roadside on which the user terminal is located, the roadside positioning model being a machine learning model configured to determine the roadside positioning result based on the positioning information and the wireless signal information.

2. The method according to claim 1, wherein determining the roadside positioning result comprises:
    inputting the positioning information and the wireless signal information to the roadside positioning model; and
    obtaining the roadside positioning result of the user terminal outputted by the roadside positioning model.

3. The method according to claim 1, wherein determining the roadside positioning result comprises:
    transmitting a roadside positioning request to a server, the roadside positioning request comprising the positioning information and the wireless signal information, wherein the server is configured to determine the roadside positioning result of the user terminal by using the roadside positioning model according to the positioning information and the wireless signal information; and
    receiving the roadside positioning result of the user terminal from the server.

4. The method according to claim 1, wherein the wireless signal information includes a correspondence between identification information of at least one group of wireless transmission apparatuses and signal strength information.

5. The method according to claim 4, wherein determining the roadside positioning result comprises:
- determining, based on the positioning information, a target road on which the user terminal is located;
- screening the wireless signal information based on the signal strength information, to obtain target wireless signal information, wherein the target wireless signal information includes wireless signal information whose signal strengths indicated by the signal strength information are greater than a target value;
- determining a first quantity value and a second quantity value according to identification information of wireless transmission apparatuses comprised in the target wireless signal information, wherein the first quantity value is a quantity of wireless transmission apparatuses located on a first roadside of the target road, and the second quantity value is a quantity of wireless transmission apparatuses located on a second roadside of the target road;
- determining, in response to determining that the first quantity value is greater than the second quantity value, that the user terminal is located on the first roadside; and
- determining, in response to determining that the first quantity value is less than the second quantity value, that the user terminal is located on the second roadside.

6. The method according to claim 4, wherein determining the roadside positioning result comprises:
- determining, based on the positioning information, a target road on which the user terminal is located;
- classifying, based on the identification information of the wireless transmission apparatuses, the wireless signals in the wireless signal information, to obtain first wireless signal information from a first roadside of the target road and second wireless signal information from a second roadside of the target road;
- performing summation on signal strength information in the first wireless signal information and signal strength information in the second wireless signal information, to obtain first signal strength information corresponding to the first wireless signal information and second signal strength information corresponding to the second wireless signal information;
- determining, in response to determining that a signal strength indicated by the first signal strength information is greater than a signal strength indicated by the second signal strength information, that the user terminal is located on the first roadside; and
- determining, in response to determining that the signal strength indicated by the first signal strength information is less than the signal strength indicated by the second signal strength information, that the user terminal is located on the second roadside.

7. The method according to claim 1, further comprising:
- determining, according to the positioning information, an environment in which the user terminal is located; and
- performing, in response to determining that the environment in which the user terminal is located is a roadside of a target road, the operation of obtaining wireless signal information of the user terminal.

8. The method according to claim 7, further comprising:
- determining, in response to determining that the environment in which the user terminal is located is the roadside of the target road, a width of the target road, the width being a sum of widths of lanes of the target road; and
- performing, in response to determining that the width is less than a threshold, the operation of obtaining wireless signal information of the user terminal, wherein the threshold is determined based on a positioning error of the positioning information.

9. The method according to claim 1, further comprising:
- labeling, in a positioning result display interface based on the roadside positioning result, a roadside of a target road on which the user terminal is located.

10. The method according to claim 1, wherein the wireless signal information includes a correspondence between identification information of at least one group of wireless transmission apparatuses and signal strength information; and
the method further comprises:
- using the positioning information as a constraint condition, and screening the wireless signal information based on the identification information of the wireless transmission apparatuses or the signal strength information, to obtain screened wireless signal information, wherein
- the screened wireless signal information is used for determining the roadside positioning result of the user terminal in combination with the positioning information.

11. The method according to claim 1, further comprising: training the roadside positioning model, by:
- obtaining terminal driving data, the terminal driving data comprising positioning information and wireless signal information of a sample terminal, the positioning information being used for indicating a geographic location of the sample terminal, and the wireless signal information being used for indicating wireless signals acquired by the sample terminal at the geographic location;
- generating a training sample based on the terminal driving data, sample data of the training sample including the positioning information and the wireless signal information of the sample terminal, label data of the training sample including a label value of a roadside positioning result of the sample terminal, and the roadside positioning result being used for indicating a roadside on which the sample terminal is located; and
- training a roadside positioning model by using the training sample.

12. The method according to claim 11, wherein the terminal driving data further includes movement information of the sample terminal, the movement information being used for indicating a movement direction of the sample terminal on a sample road; and
generating the training sample comprises:
- determining, based on an orientation of the sample road and the movement direction of the sample terminal on the sample road, the label value of the roadside positioning result of the sample terminal; and
- generating the training sample by using the positioning information and the wireless signal information of the sample terminal as the sample data and by using the label value of the roadside positioning result of the sample terminal as the label data.

13. The method according to claim 11, wherein the wireless signal information includes a correspondence between identification information of at least one group of wireless transmission apparatuses and signal strength information.

14. The method according to claim 11, wherein the roadside positioning model includes an input layer, a feature extraction layer, and a classifier, wherein
the input layer is configured to input the sample data of the training sample;
the feature extraction layer is configured to extract feature information of the sample data of the training sample; and
the classifier is configured to output a predicted value of the roadside positioning result of the sample terminal based on the feature information.

15. A roadside positioning apparatus, comprising: a memory storing computer program instructions; and a processor coupled to the memory and configured to execute the computer program instructions and perform:
obtaining positioning information of a user terminal, the positioning information being used for indicating a geographic location of the user terminal;
obtaining wireless signal information of the user terminal, the wireless signal information being used for indicating wireless signals acquired by the user terminal at the geographic location; and
determining a roadside positioning result of the user terminal based on the positioning information, the wireless signal information, and a roadside positioning model, the roadside positioning result being used for indicating a roadside on which the user terminal is located, the roadside positioning model being a machine learning model configured to determine the roadside positioning result based on the positioning information and the wireless signal information.

16. The apparatus according to claim 15, wherein determining the roadside positioning result includes:
inputting the positioning information and the wireless signal information to the roadside positioning model; and
obtaining the roadside positioning result of the user terminal outputted by the roadside positioning model.

17. The apparatus according to claim 15, wherein determining the roadside positioning result includes:
transmitting a roadside positioning request to a server, the roadside positioning request comprising the positioning information and the wireless signal information, wherein the server is configured to determine the roadside positioning result of the user terminal by using the roadside positioning model according to the positioning information and the wireless signal information, the roadside positioning model being a machine learning model configured to determine the roadside positioning result; and
receiving the roadside positioning result of the user terminal from the server.

18. The apparatus according to claim 15, wherein the processor is further configured to execute the computer program instructions and perform:
determining, according to the positioning information, an environment in which the user terminal is located; and
performing, in response to determining that the environment in which the user terminal is located is a roadside of a target road, the operation of obtaining wireless signal information of the user terminal.

19. The apparatus according to claim 15, wherein the processor is further configured to execute the computer program instructions and perform:
labeling, in a positioning result display interface based on the roadside positioning result, a roadside of a target road on which the user terminal is located.

20. A non-transitory computer-readable storage medium storing computer program instructions executable by at least one processor to perform:
obtaining positioning information of a user terminal, the positioning information being used for indicating a geographic location of the user terminal;
obtaining wireless signal information of the user terminal, the wireless signal information being used for indicating wireless signals acquired by the user terminal at the geographic location; and
determining a roadside positioning result of the user terminal based on the positioning information, and the wireless signal information, and a roadside positioning model, the roadside positioning result being used for indicating a roadside on which the user terminal is located, the roadside positioning model being a machine learning model configured to determine the roadside positioning result based on the positioning information and the wireless signal information.

* * * * *